Patented Jan. 30, 1923.

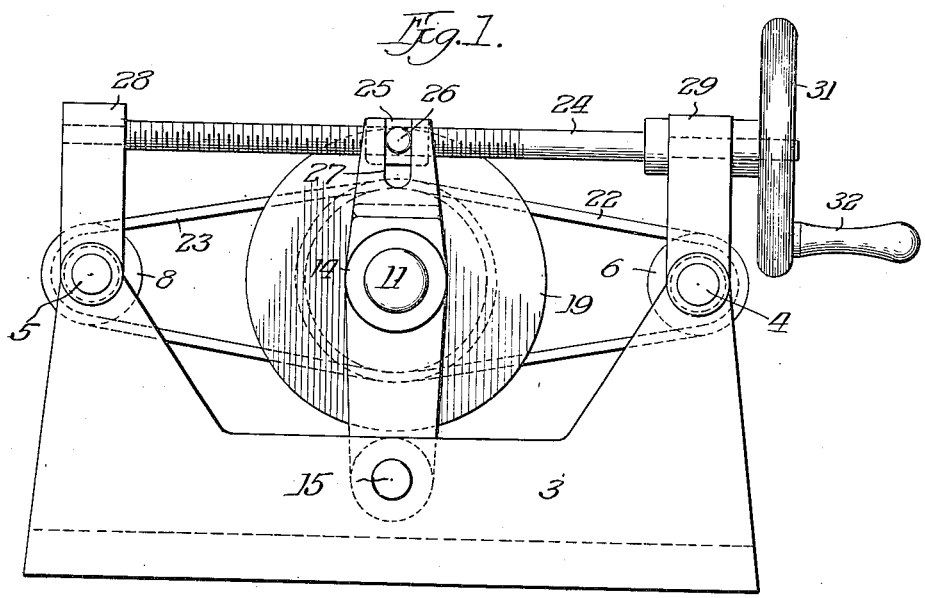
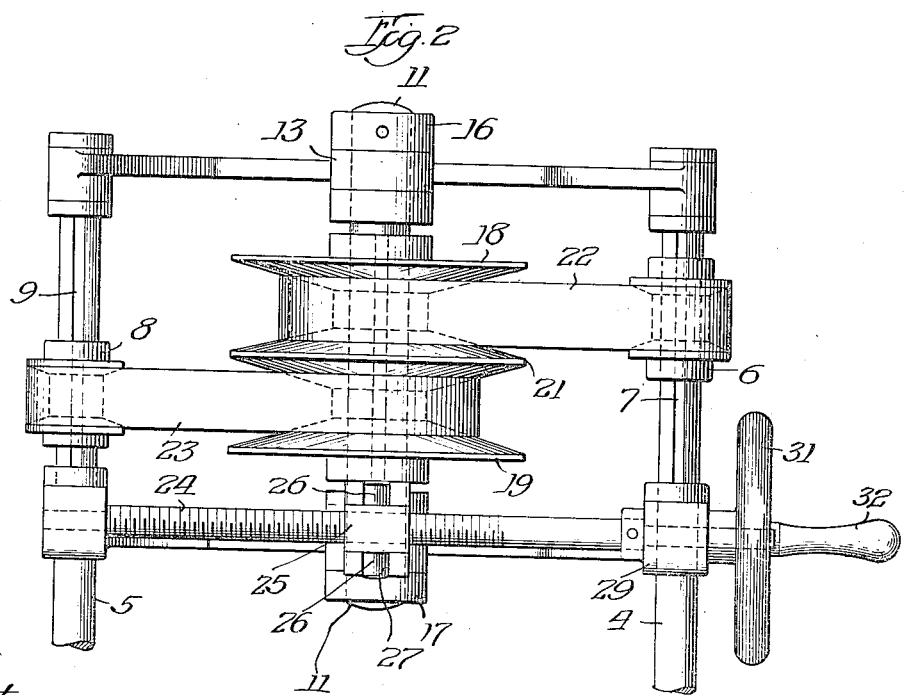

1,443,782

UNITED STATES PATENT OFFICE.

MARTIN BALCKER, OF CHICAGO, ILLINOIS, ASSIGNOR, BY DIRECT AND MESNE ASSIGNMENTS, OF ONE-FOURTH TO RUDOLPH W. GLASNER, OF CHICAGO, ILLINOIS, AND THREE-FOURTHS TO MARQUETTE TOOL AND MANUFACTURING COMPANY OF CHICAGO, ILLINOIS, A CORPORATION OF ILLINOIS.

VARIABLE-SPEED TRANSMISSION.

Application filed May 23, 1921, Serial No. 471,553. Renewed November 20, 1922.

*To all whom it may concern:*

Be it known that I, MARTIN BALCKER, a citizen of the United States, residing at Chicago, in the county of Cook and State of Illinois, have invented certain new and useful Improvements in Variable-Speed Transmissions, of which the following is a specification.

This invention relates in general to power transmission mechanism, and has more particular reference to a mechanism for transmittting variable speeds from a constantly driven driving shaft.

For the transmission of power, V-shaped belts, or as commercially known "V-belts" are quite extensively employed, and in the use of such belts, the speed may be varied by increasing or diminishing the distance between the opposed faces of the pulleys which engage the inclined sides of the belt, thus causing the belt to approach or recede from the axis of the pulley so as to diminish or increase the effective diameter of the pulley.

One of the primary purposes of the present invention is to provide a power transmission mechanism embodying V-belts as the power transmitting elements, in which the effective diameters of the power transmitting pulleys may be readily varied to thereby vary the rate of speed of power transmission.

Another purpose of my invention is to provide a power transmission mechanism of the character indicated which will be simple in construction, economical to manufacture, efficient in operation, and also durable and substantial in construction.

Other objects and many of the inherent advantages of this invention will be readily appreciated as the same is better understood by reference to the following description, when considered in connection with the accompanying drawings:

Referring to the drawings—

Fig. 1 is a side elevation of a variable speed transmission embodying my invention; and Fig. 2 is a plan view thereof.

By reference to the drawing more in detail, it will be observed that the various shafts and operating mechanisms are in the present instance shown as mounted in a body or bracket 3, but this body is merely illustrated as one convenient means of support for the various parts, and obviously, the shafts and operating mechanism may be supported in any other suitable manner.

At one side of the body there is journaled a driving shaft 4, adapted to receive its power from any suitable source, and customarily, this shaft is driven at a substantially constant speed. At the opposite side of the body, the driven shaft 5 is journaled in parallel relation to the shaft 4, and power is delivered from this shaft to any desired point of use. Upon the driving shaft there is splined a driving pulley 6 shaped to accommodate a V-belt and being secured to the shaft by the spline 7, this pulley is rotated with the shaft but is free to move longitudinally of the shaft for purposes which will be later explained. Similarly, the driven shaft 5 is equipped with a driven V-belt pulley 8 connected to the shaft through a spline 9 which permits axial movement of this pulley while causing the driven shaft to rotate therewith.

Between the driving and driven shafts, there is disposed a countershaft 11, journaled in bearings 13 and 14 formed in the upstanding arms of a yoke comprising a rock-shaft 15 journaled in the body 3, the arms being rigidly attached to the shaft to provide a rigid yoke which is capable of swinging movements about the shaft 15. The shaft is maintained against longitudinal movement in its bearings by collars 16 and 17 attached to the ends thereof, and upon the shaft between the upstanding arms of the supporting yoke, there are fixedly secured in spaced relation the cone-faced discs 18 and 19. Between these discs, the tapered disc 21 is splined upon the shaft so as to rotate therewith, and at the same time, be capable of longitudinal adjusting movements axially of the shaft.

The inclination of the opposite faces of the tapered discs and also of the cone-faced discs is such that an effective frictional driving relation will be established between these discs and a pair of V-belts 22 and 23 of well known construction, which are disposed between the discs and engaged with the driving and driven pulleys 6 and 8 respectively.

Power is therefore transmitted from the driving pulley 6 through the belt 22 to the discs 18 and 21 between which the belt is disposed and with which it has frictional driving relation. From the countershaft thus driven by the pulley, consisting of the discs 18 and 21, the power is transmitted to the V-belt 23 from the other face of disc 21 and the co-operating face of disc 19, these discs forming the driven pulley from which the power is transmitted through the belt 23 to the driven pulley 8. The two pulleys on the countershaft 11 therefore, comprise a common member, namely, the disc 21, which forms a part of each pulley.

If the belts 22 and 23 are of equal length and the shaft 11 is disposed midway between the driving and driven shafts 4 and 5, the driven pulley 8 will be rotated at the same speed as the driving pulley 6, provided, of course, that these two pulleys are of the same diameters. In order to vary the rate of speed between these pulleys, the countershaft 11 is adapted to be laterally adjusted, and while any preferred mechanism for effecting this adjusting movement may be employed, I have shown in the present instance, one simple and practical device consisting of a screw-threaded shaft 24 extending transversely of the countershaft and carrying a nut 25 equipped with laterally projecting studs 26 which engage in slots 27 formed in the upper end of one of the yoke arms, the arm being bifurcated at its upper end to accommodate the body of the nut. This shaft 24 is rotatably mounted in bearings 28 and 29, and is equipped at one end with a hand wheel 31, preferably provided with a crank handle 32 by means of which shaft 24 may be rotated.

Assuming that shaft 24 is rotated so as to cause the nut 25 to move toward the right, viewing Fig. 1, it will be obvious that this movement will increase the tension upon driven belt 23, and decrease the tension upon the driving belt 22. The tapered disc 21, disposed between the belts, will automatically compensate for this difference in tension between the belts by moving axially of the countershaft away from the disc 19 toward the disc 18 until the tension on the two belts is equalized. The axial movements of the disc 21 is obviously accompanied by a slight lateral movement of the belts 22 and 23, which causes the pulleys 6 and 8 to correspondingly move longitudinally of their respective shafts and thereby maintain the requisite alignment with the belts. This movement of the tapered disc will permit the belt 23 to approach the axis of the countershaft and cause the belt 22 to recede from the axis of this countershaft, thus diminishing the effective diameter of the pulley, comprising the discs 19 and 21, and increasing the effective diameter of the pulley comprising the discs 18 and 21. The variations in the diameters of these pulleys, thus produced, will cause a reduction of speed between the driving pulley 6 and the countershaft, and a further reduction between the countershaft and the driven pulley 8. The degree of speed variation may be regulated by the extent of lateral adjustment of the countershaft, and by this adjusting mechanism, the speed ratio between the driving and driven pulleys may be either increased or diminished, or the pulleys may be caused to rotate at one and the same speed if so desired.

From the foregoing, it should be apparent that I have provided a variable speed transmission in which very slight changes in the speed ratio may be secured. These speed changes are not abrupt, as is necessarily the case with change-speed gear transmissions, but the speed changes merge gradually from one into another, thus avoiding abrupt momentum changes and the incident shocks and jars resulting therefrom. For purposes of illustration merely, I have shown in the present case one driving and one driven belt, but it is to be understood that my invention contemplates employment of a plurality of driving and driven belts, in which instance, a series of tapered discs 21 would be mounted on the countershaft between the cone-faced discs, each forming part of a driving and driven pulley, and the driving and driven belts would be engaged with alternate pulleys, the driving and driven shafts being equipped with the requisite number of pulleys 6 and 8, all loosely splined on the shafts so as to automatically center themselves and maintain their alignment with the pulleys on the countershaft.

My improved transmission is extremely simple in construction and economical to manufacture, and may be employed for a wide variety of uses. It is to be understood, however, that the invention is not circumscribed by the details of construction herein illustrated, but is capable of embodiment in many forms within the scope of the invention, as defined in the following claims.

I claim:

1. In a variable speed transmission, the combination of a countershaft, a pair of cone-faced discs fixed on said shaft in spaced relation, and a tapered disc mounted upon said shaft for rotation therewith and adapted to be axially moved between said cone-faced discs.

2. In a variable speed transmission, the combination of a countershaft, a pair of cone faced discs fixed thereon in spaced relation, a tapered disc mounted on said shaft between said cone-faced discs for rotation with the shaft and also so as to be movable longitudinally of said shaft, and means for adjusting said shaft in a transverse direction.

3. In a variable speed transmission, the combination of a shaft, a pair of cone-faced discs fixed on said shaft in spaced relation, a tapered disc mounted on said shaft for rotation therewith and between the cone-faced discs, a pair of V-belts engaged between adjacent discs, and means for adjusting said shaft transversely to vary the tension on said belts.

4. In a variable speed transmission, the combination of driving and driven shafts, driving and driven pulleys mounted thereon for rotation therewith and also so as to be capable of longitudinal movement on their respective shafts, a countershaft between said driving and driven shafts, a pair of cone-faced discs fixed on said countershaft, a tapered disc mounted on said countershaft between said cone-faced discs, a driving V-belt engaging said driving pulley and also one of said cone-faced discs and said tapered disc, and a driven belt engaging said driven pulley and also the other of said cone-faced discs and said tapered disc.

5. In a variable speed transmission, the combination of driving and driven shafts arranged in parallel relation, a countershaft disposed between said driving and driven shafts, means for adjusting said countershaft toward and from said driving and driven shafts, a pair of cone-faced discs fixed on said countershaft, a tapered disc mounted on said countershaft for rotation therewith and for adjustment longitudinally of the shaft and between said cone-faced discs, driving and driven pulleys mounted on said driving and driven shafts respectively for rotation therewith and for axial adjustment with respect thereto, a V-belt disposed between one face of said tapered disc and the opposed face of one of said cone-faced discs and engaged with said driving pulley, and another V-belt engaged between the opposite face of said tapered disc and the face of the other cone-faced pulley and engaged with said driven pulley.

6. In a variable speed transmission, the combination of driving and driven shafts, pulleys mounted thereon for rotation therewith and for adjustment longitudinally of the shafts, a countershaft, driving and driven pulleys on said countershaft including a tapered disc forming a portion of adjacent driving and driven pulleys, and means for adjusting said countershaft toward and from said driving and driven shafts.

7. In a variable speed transmission, the combination of driving and driven shafts, a countershaft, driving and driven pulleys on said countershaft, including a pair of opposed cone-faced discs fixed on said shaft, and an intermediate tapered disc forming a common element of said pulleys, and pulleys mounted on said driving and driven shafts so as to be capable of longitudinal adjustment thereon for the purpose of maintaining alignment with the pulleys on the countershaft.

8. In a variable speed transmission, the combination of driving and driven shafts, a countershaft, pulleys thereon, comprising a pair of opposed cone-faced discs and an intermediate tapered disc all mounted on said countershaft, a screw threaded rotatable adjusting shaft disposed transversely of said countershaft, a nut on said adjusting shaft, and a connection between said nut and said countershaft, whereby lateral movement is imparted to the countershaft upon rotation of said adjusting shaft.

9. In a variable speed transmission, the combination of co-axial driving and driven V-belt pulleys including a common tapered disc mounted for rotation with and axial movement with respect to said pulleys, V-belts engaging with said respective pulleys, and means for varying the tension on said belts whereby said disc is moved away from the belt of greater tension to change the effective diameters of the pulleys.

10. In a variable speed transmission, the combination of a plurality of co-axially mounted V-belt pulleys comprising a common tapered disc and a pair of cone-faced discs mounted in opposed relation to said tapered disc, said tapered disc being mounted for rotation with and for axial movement with respect to the said pulleys, driving and driven V-belts engaging with said respective pulleys, and means for imparting an axial movement to said tapered disc to vary the effective diameters of said pulleys.

11. In a variable speed transmission, the combination of a countershaft, a pair of cone-faced discs mounted on said shaft in spaced relation, a tapered disc also mounted upon said shaft for rotation therewith and for axial movement with respect thereto and disposed between said cone-faced discs, a V-belt engaging each face of said tapered disc and the opposed face of a cone-faced disc, and means for causing said tapered disc to be moved axially between said cone shaped discs to vary radially the line of engagement between said blades and said discs.

MARTIN BALCKER.